United States Patent [19]
Lange

[11] 3,741,537
[45] June 26, 1973

[54] APPARATUS FOR FEEDING THE PILE BOARD OF A SHEET SEPARATING DEVICE

[75] Inventor: Werner Lange, Berlin, Germany

[73] Assignee: Veb Pentacon Dresden Kamera-und Kinowerke, Dresden, Germany

[22] Filed: July 16, 1971

[21] Appl. No.: 163,339

[52] U.S. Cl. .................................................. 271/61
[51] Int. Cl. ............................................... B65h 1/00
[58] Field of Search ..................... 271/61, 62 R, 36, 271/39, 3; 95/14, 89

[56] References Cited
UNITED STATES PATENTS
3,126,122   3/1964   Sacre ........................... 271/61 CS Primary Examiner—Richard E. Aegerter
Attorney—William Anthony Drucker

[57] ABSTRACT

A photo-copying apparatus has a housing containing a stack receiving platform, means for separating and feeding sheets from a stack on the platform and a replaceable cassette. An aperture in the housing adjacent the platform enables the cassette to be inserted. Guides for supporting the cassette above the platform are provided which cassette has a withdrawable stack supporting slide which seals the cassette against entry of light. Means are provided for sealing the housing against light entry when the cassette is inserted. A stack of sheets in a cassette in the housing can be transferred to the platform by withdrawal of the slide.

13 Claims, 12 Drawing Figures

PATENTED JUN 26 1973 3,741,537

APPARATUS FOR FEEDING THE PILE BOARD OF A SHEET SEPARATING DEVICE

BACKGROUND TO THE INVENTION

The invention relates to an apparatus for feeding the pile board of a sheet separating device with photographic paper or film carriers in sheet form, in an apparatus for the exposure and/or developing of the said paper.

It has become customary, particularly during recent times, for sheet-form photographic film bases requiring treatment to be automatically fed from a pile of sheets to the "treatment stations" by means of a sheet separating device. Sheet separating devices of this kind, however, have hitherto mainly been used for photographic materials of the type showing little if any sensitivity to daylight or to the light used for room lighting, such as diazo-photographic or electro-photographic materials. If these devices are to be fed with photographic materials sensitive to the aforementioned light sources, the operation of feeding the pile boards of the sheet separating devices has to be carried out in the dark, i.e. at least the feed side of the apparatus for the exposure and/or developing of the sheet materials has to be situated in a dark compartment.

OBJECT OF THE INVENTION

The purpose of the present invention is to provide an apparatus for feeding the pile board of a sheet separating device with a pile of daylight-sensitive materials, which apparatus will enable the feeding operation to be carried out in daylight.

SUMMARY OF THE INVENTION

According to the invention in a photo-copying apparatus having a housing containing a stack receiving platform, means for separating and feeding sheets from a stack on the platform and a replaceable cassette, there is provided:

a. an aperture in the housing adjacent the platform through which aperture the cassette is inserted, b. guide means arranged in said housing close to said platform and adapted to guide the cassette above the platform, c. a withdrawable stack supporting slide in the cassette adapted to seal the cassette against entry of light, and d. means for sealing the housing against light entry when the cassette is inserted, wherein, when a cassette containing a stack of sheets is inserted into the housing through the aperture on the guide means, withdrawal of the slide effects loading of the stack onto the platform.

The locking slide is preferably adapted at one end to conform to the profile of the housing.

The means for separating and feeding sheets may be mounted in immediate succession to and on a level with the guide means and the platform may extend from the aperture to the means for separating and feeding sheets.

As a further development of the invention, the pile board, in conjunction with two pairs of rocking levers mounted on the stand of the apparatus, forms an articulated parallelogram, while a manual lever, likewise mounted on the stand, can be coupled via a spring, and on the "force-locking" principle, with one of the rocking levers, the force of the said spring being made greater than that of a spring which presses the pile in the direction of the draw-off means.

The bearing point provided on the stand, for the rocking lever, preferably forms the fulcrum for the hand lever which can be coupled with it.

As a further development of the invention, the hand lever is provided with a recess accommodating the prolonged end of a shaft on which one of the two pairs of rocking levers is mounted and over which extends the free end of a spring affixed to the said hand lever.

To enable the pile which has dropped out of the cassette onto the pile board to be moved into the zone of the separating device and to align the front edge of the sheets at the same time along a stop device integral with the housing, the manual lever in the case of a further development of the object of the invention bears a control pin which, when the said lever is pivoted, can be coupled on the "force-locking" principle with a segment lever which is rotatably mounted on the stand and which is influenced by a spring and which in its turn is rigidly connected with a slide which extends round the rear of the pile of sheets and which passes through a recess in the pile board. The free end of the slide is preferably bent aside in such a way as to form an acute angle in respect of the perpendicular when the slide is in its initial position.

To enable the piled sheets to be aligned laterally likewise, a further version of the invention comprises a control lever which is affixed to a shaft bearing the segment lever and the slide and which can be coupled to a further spring-loaded slide which is situated opposite one of the lateral surfaces of the pile and mounted on the stand. The free end of this slide likewise is preferably bent aside in such a way that when it is in its initial position it forms an acute angle to the vertical.

To ensure that during the separating process both slides remain in their working position, i.e. keep the piled sheets aligned, in respect of their front and side edges, a further version of the invention comprises a locking lever mounted on the stand and provided at its free end with a recess which interacts with a detent of the segment lever, as a result of which the latter is secured in its operating position.

In order to nullify this locking action before the process of feeding the pile board is repeated, a further embodiment of the invention comprises a release pawl taking the form of a two-armed lever, situated in a notch provided in the locking lever, the shorter lever arm resting against the recess while the longer lever arm extends into the path of movement of the control pin affixed to the hand lever.

If the separating device consists of an entrainment device which draws back the uppermost sheet from a holding lug, in opposition to the draw-off direction, the sheet being caused to undulate upwards in this process, and of a draw-off segment which then comes into operation and acts in the draw-off direction, the free end of the slide in a further version of the invention takes the form of a holding lug acting on the rear edge of the pile of sheets.

Finally, in a further development of the invention, in conjunction with a continuous exposure apparatus, guides are provided, on the delivery side, for a cassette which accommodates the exposed material and of which the design corresponds to that used for feeding the pile.

BRIEF DESCRIPTION OF DRAWINGS

The invention will be described below in greater detail by reference to an example.

The diagrams are as follows.

DESCRIPTION OF PREFERRED EMBODIMENT

Figure 1:
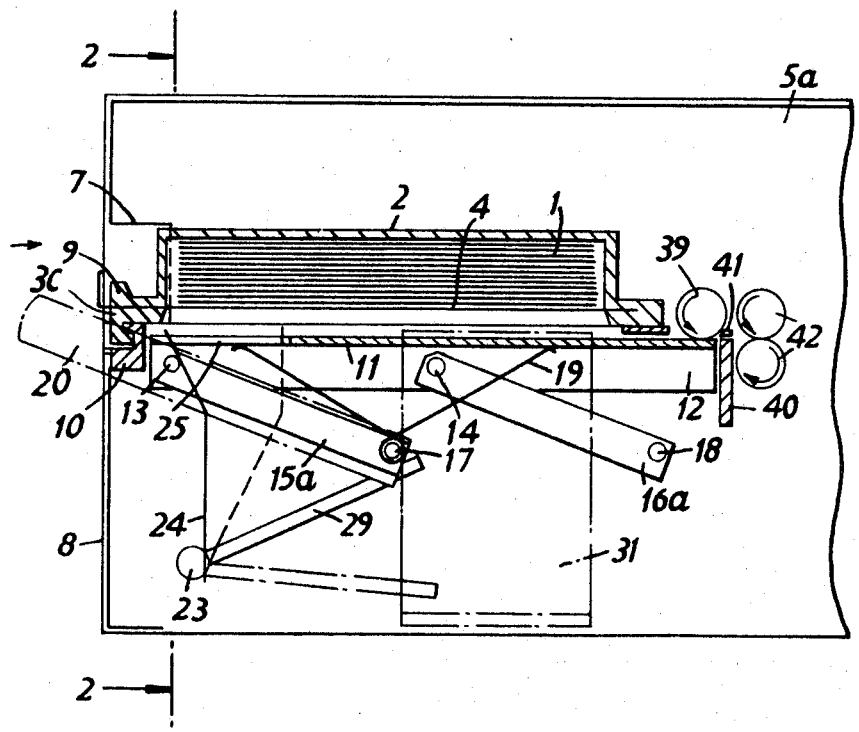
FIG. 1: a sectional diagram of the apparatus for feeding the pile board of a sheet separating device of an apparatus for the treatment of photographic materials.
Figure 2:
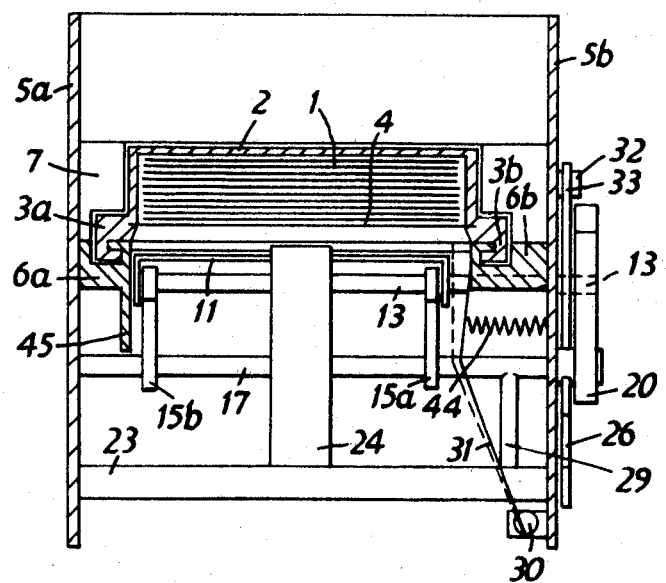
FIG. 2: a section along the line A—A of FIG. 1.

A cassette 2 accommodating the refill pile 1 of sheet - form photographic materials is provided on three sides with labyrinth guides 3a, 3b and 3c, as well as with an extractible locking slide 4. The cassette, with the locking slide 1 facing downwards, is introduced from the feed side, in the direction shown by the arrow (FIG. 1), through an orifice, into an apparatus for the treatment of sheet-form photographic film bases, in which process U-shaped guide bars 6a and 6b affixed to the lateral walls 5a and 5b of the apparatus, engage the labyrinth guides 3a and 3b of the cassette. The insertion orifice for the cassette 2 is adapted to the profile of the latter, inasmuch as the feed side of the apparatus is formed by an upper shutter 7 and a lower shutter 8. The upper shutter 7 is stepped, so that it can conveniently engage a gripping piece 9 provided on and integral with the cassette. A U-shaped stop bar 10 engaging the labyrinth guide 3c of the cassette 2 fixes the said cassette 2 in a position in which it is situated above the pile board 11 of a sheet separating device.

The pile board is mounted in the apparatus by means of an articulated parallelogram, in such a way that it can be raised and lowered, inasmuch as the longitudinal sides 12 of the pile board, which are bent at an angle, bear two shafts 13 and 14 on which are mounted two pairs of rocker arms 15a, 15b, and 16a, 16b, of which the other end rests on two shafts 17 and 18 which are supported by the lateral walls 5a and 5b. A two-armed torsion spring 19 rests on the shaft 17, the free ends of the said spring resting on the lower side of the pile board 11 and pressing the latter upwards.

Figure 3:
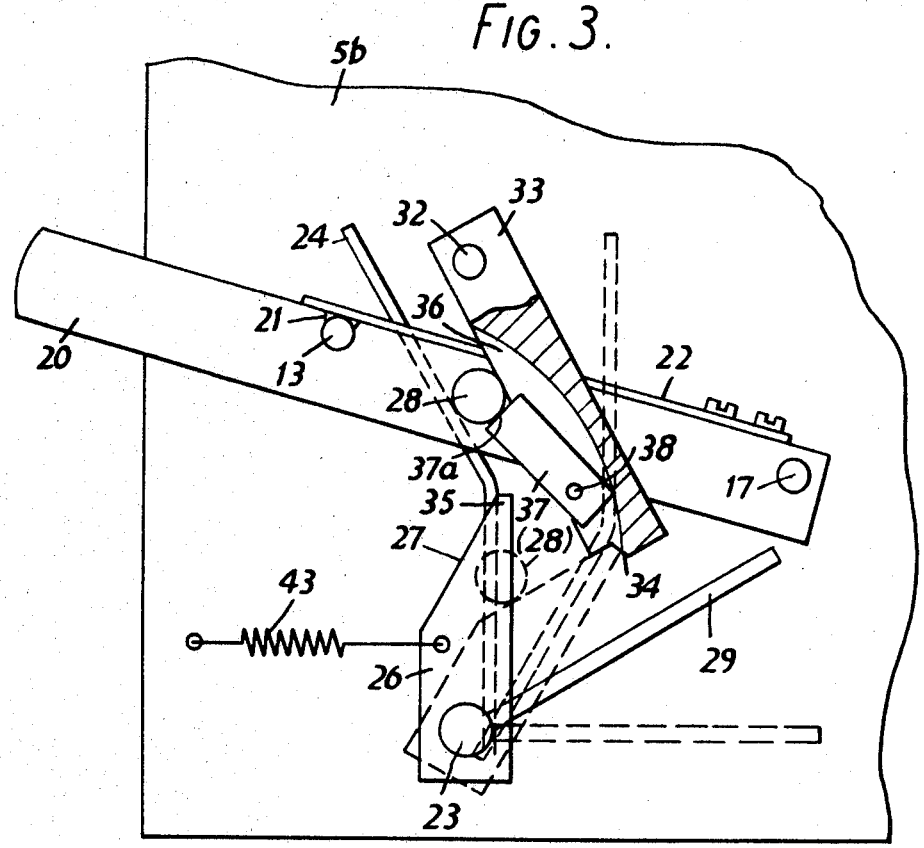
FIG. 3: further details, on an enlarged scale, of the apparatus illustrated in FIGS. 1 and 2.

On the prolonged end of the shaft 17, which passes through the lateral wall 5b, is mounted a hand lever 20, which is freely rotatable and of which the end extends beyond the contours of the apparatus. The said lever is provided with a recess 21 (FIG. 3) which, when the hand lever 20 is in the position of rest, is engaged by the end of the shaft 13, which end is likewise prolonged and passes through the lateral wall 5b. The reff end of a leaf spring 22 affixed to the upper end of the hand lever extends over the prolonged end of the shaft 13.

To a further shaft 23 mounted between the lateral walls 5a and 5b is affixed a slide 24 of which the free end passes through a recess 25 of the pile board 11 and is bent at an angle in such a way as to form an acute angle to the vertical when the slide 24 is in the initial position. To the shaft 23 is also affixed a segment lever 26 having a bevelled surface 27 which interacts with a control pin 28 provided on the hand lever 20. The shaft 23 also bears a control lever 29 which interacts with a slide 31 which is likewise bent at an angle and which is mounted on the stand of the apparatus at the point marked 30.

The free end of alocking lever 33 mounted on the stand of the apparatus at the point marked 32 is provided with a recess 34 which interacts with the free end belonging to the segment lever 26 and taking the form of a detent 35. In a recess 36 of the locking lever 33 a release pawl 37, constructed as a two-armed lever, is mounted at the point marked 38, the short end of the lever resting on the recess 36.

The sheet separating device is formed by a draw-off roll 39 already known in itself, which rests on the uppermost sheet of the pile and guides the said sheet to a gap which is formed between a stop 40, integral with the housing and serving for the front edge of the piled sheets, and a bar 41 provided at a certain distance from the said stop and covering the front edge of the pile and somewhat greater in width than the thickness of the sheets to be processed. The gap is followed by a continuously driven pair of transport rolls 42, from which the individual sheets are conveyed to the processing station or stations. The draw-off roll 39 is driven intermittently in a manner already known in itself.

Figure 4A:
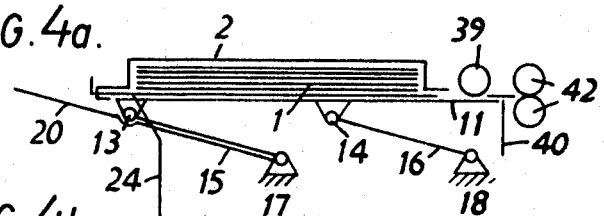
FIG. 4a-f: a schematic diagram of the apparatus shown in FIGS. 1 - 3, in different operating phases.
Figure 4B:
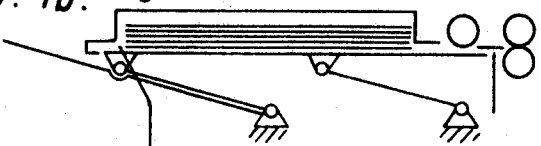

The feed device for the pile board operates as follows:

After the cassette 2, filled with the refill pile 1, and with the locking slide 4 facing downwards, has been inserted, on the guide rails 6a and 6b, into the apparatus (FIG. 4a), the locking slide 4 is extracted. This causes the refill pile 1 to drop onto the pile board 11 through the force of gravity (FIG. 4b).

Figure 4C:
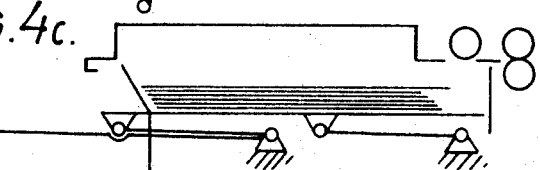
Figure 4D:
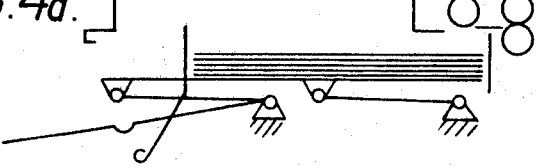

The hand lever 20 is now pivoted in an anti-clockwise direction. As the resilience of the leaf spring 22 is greater than that of the torsion spring 19, the pile board 11 is moved downwards by means of the former, via the prolonged shaft 13. The refill pile 9, completely projecting from the cassette 2, follows the said movement. When the pile board 11 occupies its bottom position the uppermost sheet of the refill pile is situated underneath the plane of the draw-off roll 39 (FIG. 4c). The hand lever 20, in its continuous movement, moves away from the shaft 13, and the control pin 28 affixed to it reaches the bevelled surface 27 of the segment lever 26, in the further pivoting movement of the hand lever 20, and pivots the said segment lever in a clockwise direction and in opposition to the force of a spring 43. The slide 24 follows this pivoting movement and thrusts the pile against the stop 40. The front part of the pile is thus situated underneath the draw-off roll 39, and the front edges of the sheets of the pile are aligned along the stop 40 (FIG. 4d). As the control lever 29 likewise follows this pivoting movement, it moves the slide 31 influenced by the spring 44, and the free end of the said slide, which is bent at an angle, thrusts the pile against a stop plate 45 which is integral with the housing and which is provided on the U-shaped guide rail 6a. The sheets of the pile are thus aligned in the lateral direction likewise. The pivoting of the hand lever 20 in an anti-clockwise direction thus effects the following functions:

The refill pile 1, together with the pile board 11, is lowered until the uppermost sheet of the pile is situated in a plane which is still below the draw-off roll 39. The pile is then thrust under the draw-off roll 39, in which process the front edges and at the same time the side edges of the piled sheets are aligned. Owing to the fact that the free ends of the two slides 24 and 31 form an acute angle in respect of the perpendicular, a conical funnel-shaped inlet is produced for the refill pile dropping out of the cassette 2, so that the said refill pile is reliably guided onto the pile board 11.

Figure 4E:
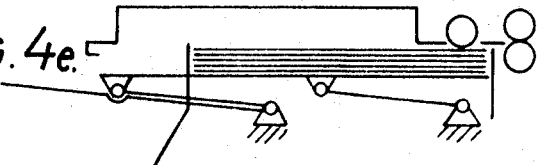
Figure 4F:
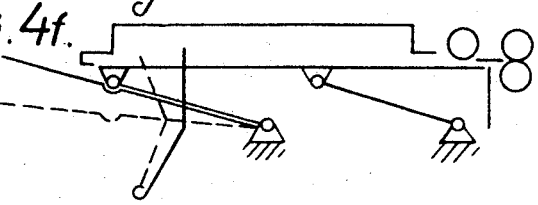

When the hand lever 20 is released the pile board 11 is guided upwards by the torsion spring 19, until the uppermost sheet is resting on the draw-off roll 39 (FIG. 4e). During the separating process the two slides 24 and 31 remain in their pivoted position, since the detent 35 of the segment lever 26 has dropped into the recess 34 of the locking lever 33. The hand lever 20, during the draw-off operation, gradually moves into its initial position, in which process the control pin affixed to it presses the longer lever arm of the release pawl 37 of the locking lever 33 into the recess 36 during the last part of the movement of the said control pin. After the control pin 28 has passed the release pawl 35 the latter pivots in an anti-clockwise direction, owing to the force of gravity, so that the control pin 28 is now resting on the surface 37a of the release pawl 37.

When the last sheet of a pile has been drawn off the cassette 1 is removed from the apparatus. Before the commencement of a further feeding operation for the pile board 11 the slides 24 and 31 have to be restored to their initial position. This is achieved by pivoting the hand lever 20 by a short distance in the anti-clockwise direction, in which process the control pin 38 resting on the surface 37a of the release pawl 37 pivots the locking lever 33 in an anti-clockwise direction. In this process the detent 35 of the segment lever 26 is released and the latter moved into the initial position by the spring 43 acting on it. The two slides 24 and 31 (FIG. 3f) follows this pivoting movement. The pile board 11 is thus ready to receive a refill pile.

Figure 5:
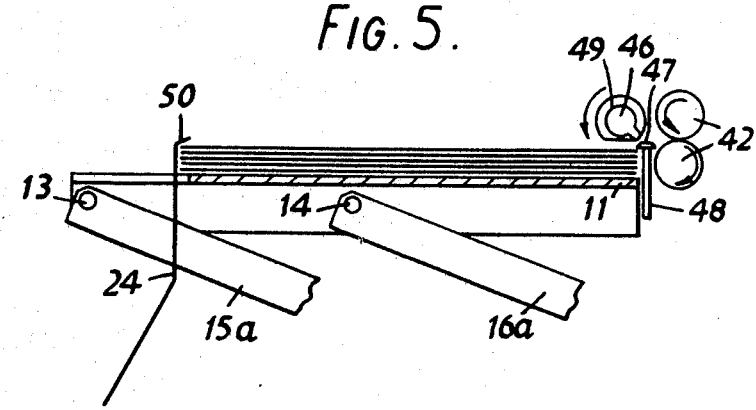
FIG. 5: the apparatus with a sheet separating device different from that shown in FIGS. 1 - 4.

FIG. 5 shows another version of the separating device. This consists, in the manner already known in itself, of an entrainment device 46 which is driven in a clockwise direction and by which the uppermost sheet of the pile is extracted, undulating upwards in the process, from a holding-down device 47 which extends across the front edge of the pile of sheets and which is provided on an integral with the stop 48 for the front edges of the piled sheets. Coaxially with the entrainment device 46 a draw-off segment 49 is provided, which is driven in an anti-clockwise direction and by which the uppermost sheet is conveyed via the holding lug 47 to the subsequent pair of transport rolls 42. To enable this principle to be applied the free end of the slide 24 takes the form of aholding-down device 50 for the rear edge of the pile of sheets.

Figure 6:
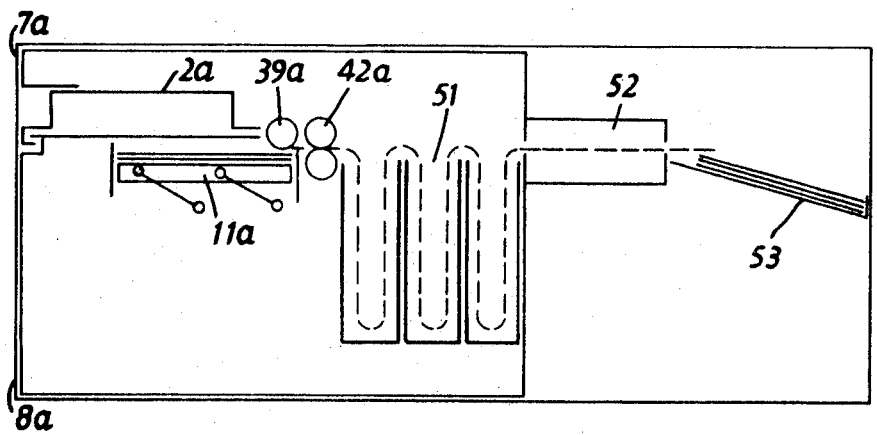
FIG. 6: the feed device according to the invention, in conjunction with a continuous developing apparatus, for sheet-form materials.
Figure 7:
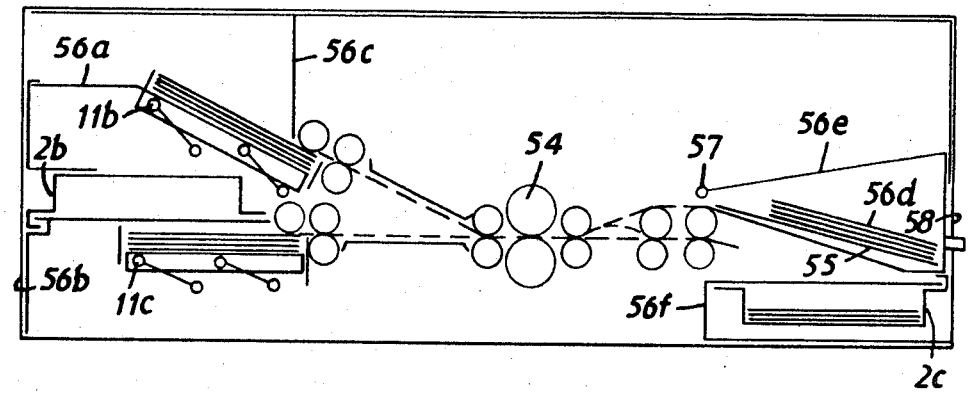
FIG. 7: the feed device according to the invention, in conjunction with a continuous contact printing apparatus for sheet-form materials.

In. FIGS. 6 and 7 the feed device according to the invention is shown schematically in conjunction with continuous devices for the treatment of photographic film bases. FIG. 6 shows a continuous developing applicance. The pile board 11a is fed, in the manner described, by means of the cassette 2a, which may contain, for example, a pile of flat films, of which the individual films have been exposed in a reproduction camera. The uppermost sheet of the pile is conveyed, by means of the intermittently driven draw-off roll 39a, to the continuously driven pair of transport rolls 42a, after which, in a manner already known in itself and and only cursorily shown in the drawing, the separated film bases pass through the various treatment baths 51 and also through a drying section 52, e.g. by means of roller conveyor systems. After leaving the drying section 52 the developed films are piled, in the known manner, in an inclined collecting container 53. Shutters 7a and 8a are used to ensure that no light emanating from the feed side of the apparatus will encounter the photographic material removed from the cassette. For the production of positive flat film prints the piled and developed negatives are taken from the collecting container 53 and laid on the upper pile board 11b belonging to a continuous contact printing apparatus and equipped with a sheet separating device (FIG. 7).

By means of the cassette 2b which contains the unexposed positive flat films and of which the construction corresponds to that of the cassette 2a used for feeding the developing apparatus the lower pile board 11c is fed in the manner described. The flat films taken at the same time from the two pile boards 11b and 11c are guided together and by means of roller conveyor systems of a known kind through an exposure device 54 only cursorily shown in the drawing, after which they are separated from one another in the known manner, in which process the negative flat films are piled in a collecting container 55 and the exposed but so far undeveloped positive flat films are piled in a cassette 2c of which the construction corresponds to that of the cassette 2b serving for the feeding operation, but in contradistinction to the feed side the cassette can be introduced, with the locking slide facing upwards, into the delivery side of the apparatus, by means of appropriate guide bars. Shutters 56a – f, ensure, both on the feed side and on the delivery side, that no extraneous light can encounter the positive material. The shutter 56e is mounted so that it can be pivoted about the fulcum 57 and covers an aperture 58 provided on the delivery side and serving for the extraction of the collected negatives.

The cassette 2c, which is introduced on the delivery side and which accommodates the exposed positive flat films, is inserted, for the developing of these films, into a continuous developing apparatus constructed as shown in FIG. 7. If the developer and the film material are properly coordinated with each other one and the same developing apparatus can then be used both for the negative and for the positive flat films.

I claim:

1. In a photo-copying apparatus having a housing containing a stack receiving platform, means for separating and feeding sheets from a stack on the platform and a replaceable cassette, the provision of:
   a. an aperture in the housing adjacent the platform through which aperture the cassette is inserted,
   b. guide means arranged in said housing close to said platform and adapted to guide the cassette above the platform,
   c. a withdrawable stack supporting slide in the cassette adapted to seal the cassette against entry of light and
   d. means for sealing the housing against light entry when the cassette is inserted wherein, when a cassette containing a stack of sheets is inserted into the housing through the aperture on the guide means, withdrawal of the slide effects loading of the stack onto the platform.

2. An apparatus according to claim 1, in which the locking slide is adapted at one end to conform to the profile of the housing.

3. An apparatus according to claim 1, wherein the means for separating and feeding sheets is mounted in immediate succession to and on a level with the guide means and the platform extends from the aperture to the means for separating and feeding sheets.

4. An apparatus according to claim 1, provided with first and second pairs of rocking levers connected with the stack receiving platform which levers are mounted in the housing and form an articulated parallelogram, a manually operable lever mounted in the housing, a first spring connected between said manually operable lever and one of said first and second rocking levers, and a second spring adapted to urge the stack in the direction of the feeding means wherein the force exerted by said first spring is greater than that exerted by said second spring.

5. An apparatus according to claim 4, provided with a bearing point on the housing of the apparatus, for the rocking lever, which bearing point is adapted to form a fulcrum for said manually operable lever.

6. An apparatus according to claim 4, wherein said platform is provided with a shaft, one of said first and second pairs of rocking levers is pivotally mounted on the shaft and said manually operable lever is provided with a recess adapted to receive the end of said shaft.

7. An apparatus according to claim 4, wherein the manually operable lever is provided with a control pin and there is provided a segment lever rotatably mounted on the housing, a spring adapted to urge the segment lever into a first position and a slide connected with the segment lever and engageable with the stack, whereby operation of the manually operable lever causes engagement of the control pin with the segment lever and movement of the slide to align the stack.

8. An apparatus according to claim 7, wherein the slide comprises an arm having a free end disposed at an acute angle relative to a perpendicular axis when the segment lever is in said first position and is moveable towards the perpendicular axis to engage an edge of the stack when the manually operable lever is operated.

9. An apparatus according to claim 7, wherein there is provided a shaft mounted on the housing and bearing the segment lever and the slide, a control lever mounted on the shaft and rotatable by the manually operable lever, a second slide mounted on the housing and situated opposite one of the lateral surfaces of the stack and spring means for urging said second slide into a first position, whereby operation of the manually operable lever effects movement of the second slide which effects lateral alignment of the stack.

10. An apparatus according to claim 9, wherein the second slide comprises an arm having a free end disposed opposite one of the lateral surfaces of the stack which free end, in said first position of the arm, forms an acute angle to a vertical axis.

11. An apparatus according to claim 7, provided with a locking lever mounted on the housing and provided at its free end with a recess engageable by the segment lever when the segment lever has been rotated through a predetermined angle.

12. An apparatus according to claim 11, wherein the manually operable lever is provided with a release pin, the locking lever is provided with a recess and a release pawl is mounted in said recess and extends into the path of movement of the control pin on the manually operable lever whereby return movement of the manually operable lever causes engagement of the pawl with the release pin and disengagement of the locking lever and segment lever.

13. An apparatus according to claim 1, in combination with a continuous exposure apparatus, wherein there is provided on a delivery side of the apparatus an aperture in the housing for receiving a cassette, guide means within the aperture for guiding the cassette, a withdrawable stack supporting slide in the cassette adapted to seal the cassette against entry of light and means for sealing the aperture against light entry when the cassette is inserted wherein a stack of exposed sheets delivered to the cassette can be unloaded by removal of the cassette from the housing.

* * * * *